United States Patent
Nakagawa

[11] Patent Number: 6,163,954
[45] Date of Patent: Dec. 26, 2000

[54] METHOD OF PRODUCING A SLIDER

[75] Inventor: Koichi Nakagawa, Niigata-ken, Japan

[73] Assignee: Alps Electric Co., Ltd., Tokyo, Japan

[21] Appl. No.: 09/356,125

[22] Filed: Jul. 16, 1999

[30] Foreign Application Priority Data

Jul. 23, 1998 [JP] Japan ................................. 10-207592

[51] Int. Cl.$^7$ ....................................................... G11B 5/42
[52] U.S. Cl. ..................... 29/603.12; 29/603.16; 451/57; 451/913
[58] Field of Search ........................... 29/603.12, 603.16; 360/103, 104; 451/57, 913

[56] References Cited

U.S. PATENT DOCUMENTS

| | | |
|---|---|---|
| 5,095,613 | 3/1992 | Hussinger et al. . |
| 5,406,694 | 4/1995 | Ruiz . |
| 5,603,156 | 2/1997 | Biskeborn et al. ............... 29/603.12 X |
| 5,634,259 | 6/1997 | Sone et al. . |
| 5,722,156 | 3/1998 | Balfrey et al. . |
| 5,749,769 | 5/1998 | Church et al. .................... 29/603.12 X |

*Primary Examiner*—Carl E. Hall
*Attorney, Agent, or Firm*—Brinks Hofer Gilson & Lione

[57] ABSTRACT

A slider producing method in which a slider bar is lapped from the side of a base to the side of a thin-film element of a slider, in a fixed direction substantially perpendicular to the slider bar. Thereafter, the slider bar is polished by making it reciprocate in a direction perpendicular to the lapping operation, whereby smears are removed. The slider producing method makes it possible to prevent, in the lapping process of a slider, the formation of a stepped portion between a rail and the thin-film element of the slider, and the occurrence of a short circuit at each of the element layers of the thin-film element.

3 Claims, 12 Drawing Sheets

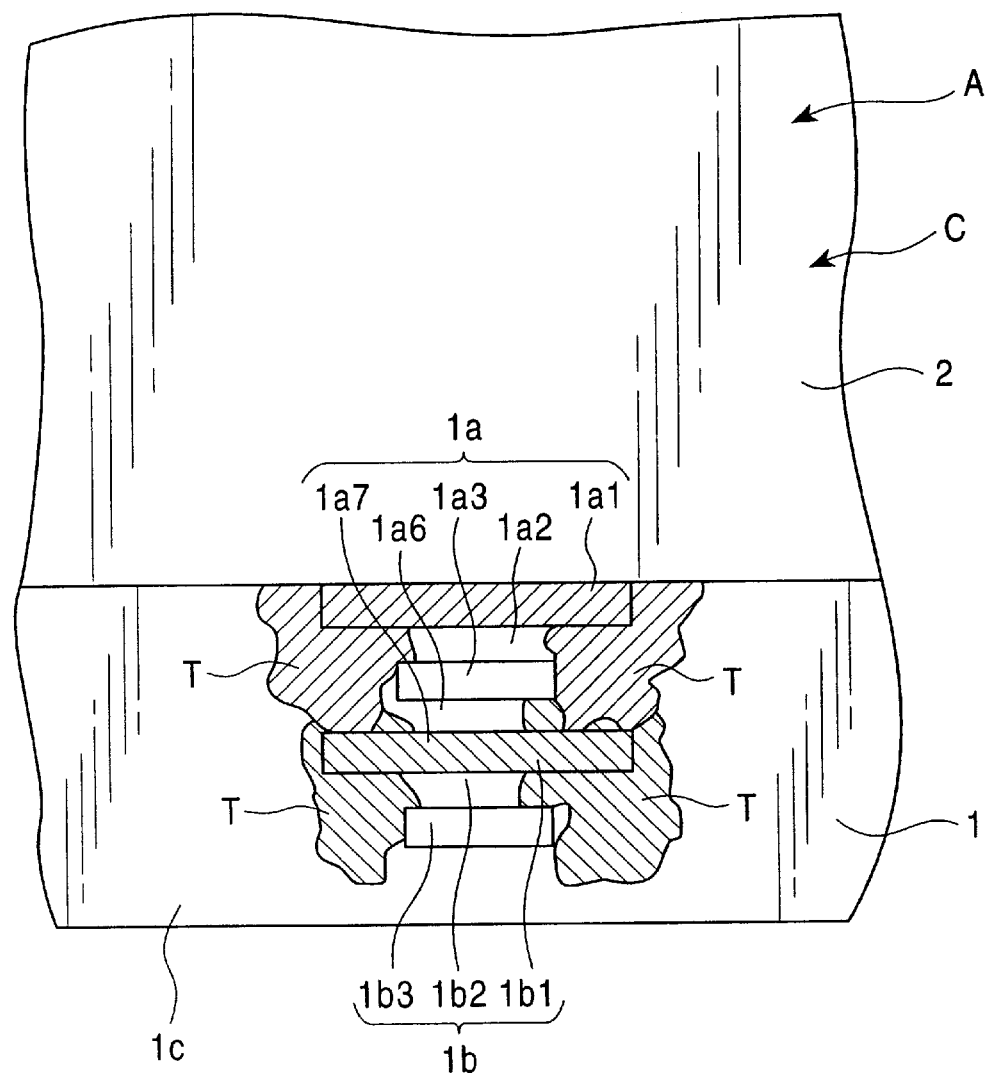

METHOD OF PRODUCING A SLIDER

BACKGROUND OF THE INVENTION

1. Field of the Invention

The present invention relates to a slider producing method, and, more particularly, to a slider producing method in which the surface of a slider where an end of a recording/reproducing thin-film element is exposed is lapped.

2. Description of the Related Art

FIG. 5 illustrates a wafer and a slider bar cut out from the wafer, in a conventional slider producing method. FIG. 6 is a sectional view of the main portion of the wafer illustrated in FIG. 5. FIG. 7 is a perspective view showing in enlarged form the main portion of the slider bar illustrated in FIG. 5. FIGS. 8A and 8B are used to illustrate the lapping process in the conventional slider producing method. More specifically, FIG. 8A schematically illustrates a lapping machine used in the lapping process, and FIG. 8B is a sectional view of FIG. 8A. FIG. 9 is used to illustrate the main steps of the lapping process, in the conventional slider producing method. FIG. 10 is a perspective view of a slider, in the conventional slider producing method. FIG. 11 is a perspective view of a slider, which has been lapped using the conventional slider producing method. FIG. 12 is a plan view showing in enlarged form the main portion of the slider illustrated in FIG. 11.

In magnetic heads used in, for example, hard disk devices, a slider, primarily formed of a ceramic material, is mounted to an end of a supporting member, formed of a leaf spring material.

A description will now be given of a conventional slider producing method. Referring to FIG. 5, a plurality of recording/reproducing thin-film elements 1 are formed in rows so as to form a pattern on a disk-shaped wafer W formed of, for example, alumina-titanium carbide ($Al_2O_3$—TiC) ceramic. Each thin-film element 1 comprises a reproducing head, for reproducing magnetic signals recorded on a magnetic recording medium, and a recording head, for recording magnetic signals onto a magnetic recording medium. Each reproducing head comprises a magnetoresistive (MR) head portion 1a formed by a magnetoresistive effect element portion. Each recording head comprises an inductive head portion 1b formed of a coil and a core, which are formed into a pattern.

As shown in FIG. 6, each MR head portion 1a comprises a lower shield layer 1a1 placed on top of a wafer W and formed of Ni—Fe alloy (permalloy); a lower gap layer 1a2 placed on top of the lower shield layer 1a1 and formed of a nonmagnetic material such as $Al_2O_3$; a magnetoresistive effect element portion 1a3 formed at the center of the layer above the lower gap layer 1a2; hard bias layer 1a4, being a vertical bias layer, formed on both sides of the magnetoresistive effect element portion 1a3; an electrically conductive layer 1a5 formed on top of the hard bias layer 1a4 (formed on both sides of the magnetoresistive effect element portion 1a3) and formed of a nonmagnetic, electrically conductive material, such as chromium (Cr); an upper gap layer 1a6 formed on top of the magnetoresistive effect element portion 1a3 and the electrically conductive layer 1a5, and formed of a nonmagnetic material such as $Al_2O_3$; and an upper shield layer 1a7 formed on top of the upper gap layer 1a6 and formed of Ni—Fe alloy (permalloy).

Each inductive head portion 1b comprises a lower core 1b1 also serving as the upper shield layer 1a7 of the MR head portion 1a; a nonmagnetic material layer 1b2 formed on top of the lower core 1b; and an upper core 1b3 formed so as to contact part of the nonmagnetic material layer 1b2. A protective film 1c, formed of $Al_2O_3$ or the like, covers the upper core 1b3 and the side of a base 2 where its associated thin-film element is formed. An insulating material (not shown) is placed on top of the nonmagnetic material layer 1b2. A spirally formed coil (not shown), formed of a low resistance, electrically conductive material (such as copper (Cu)), is embedded in the insulating material (not shown).

With the plurality of thin-film elements arranged in rows, a plurality of rectangular shaped portions are cut out from the wafer W to obtain slider bars B. As shown in FIG. 6, an end portion (or magnetic gap portion) of the MR head portion 1a and the inductive head portion 1b of each of the aforementioned thin-film elements 1 are exposed at the sectioned surface of the corresponding slider bars B.

With the slider bars B formed, the surface of each slider bar B where the magnetic gap portions of each thin-film element 1 are exposed is lapped. Each slider bar B is given a crown shape so that its center portion bulges upward, whereby each slider bar B has a spherically curved structure. Each slider bar B is lapped by a lapping machine. As shown in FIG. 8A, a lapping machine comprises a substantially circular cylindrical lapping table formed of tin (Sn), and a mounting jig 52 disposed above the lapping table 51. The lapping table 51 comprises a lapping surface 51a, from which parts of diamond grains (not shown) embedded therein are exposed, and, as shown in FIG. 8B, a plurality of concentrically formed grooves 51b provided in the lapping surface 51a. The lapping surface 51a is a spherically curved surface and a circular arc shaped recess. The mounting surface 52a of the mounting jig 52, to which each of the slider bars B is mounted, is a convex-shaped surface formed in correspondence with the spherically curved shape of the lapping surface 11a and so as to oppose the lapping surface 51a.

The plurality of slider bars B are mounted to the convex-shaped mounting surface 52a of the mounting jig 52 with a resilient adhesive material so as to be bent in the longitudinal direction thereof and along the convex-shaped mounting surface 52a. As shown in FIG. 9, the slider bars B are disposed in the longitudinal directions thereof, and in the direction of rotation of the mounting surface 52a. The surface of each slider bar B where the magnetic gap portions of each thin-film element are exposed is disposed so that it can come into contact with the lapping surface 51a of the lapping table 51. A load is applied to the mounting jig 52 from thereabove, causing each of the slider bars B to be pressed against the lapping surface 51a. As shown in FIG. 6, each of the slider bars B is lapped by rotating the lapping table 51 at a proper speed, and by rotating the mounting jig 52, to which the slider bars B are mounted, while supplying a lubricant to the lapping surface 51a. Excess lubricant or diamond grains, which have come off the lapping surface 11a, fall into the grooves 51b. (This is not illustrated.)

Each of the slider bars B (given a crown shape by lapping) is formed into a predetermined shape by, for example, a photolithography process or ion milling, and is divided to form a plurality of sliders S. As shown in FIG. 10, each slider S comprises a substantially rectangular parallelepiped base 2 formed of, for example, alumina-titanium carbide ($Al_2O_3$—TiC) ceramic; an air groove 3 formed in its associated base 2; rails 4 and 4 formed on both sides of its associated air groove 3; a thin-film element 1 formed on a side end face of its associated base 2; and inclined portions 5 and 5 formed on its associated base 2 or at the side of the corresponding rails 4 and 4 opposite to the side where its associated thin-film element 1 is formed. The magnetic gap portion of each MR head portion 1a and the magnetic gap portion of each inductive head portion 1b are exposed at the top surface of one of the rails 4 of their associated slider S. The surface of each slider S where the magnetic gap portions are exposed constitutes an air bearing surface (ABS), or floating surface, which faces a magnetic recording medium. Each rail 4 has a crown shape C whose center portion bulges slightly upward, whereby each rail 4 has a spherically curved structure. Accordingly, the sliders S are obtained.

SUMMARY OF THE INVENTION

The hardness of $Al_2O_3$, the hardness of Ni—Fe alloy (permalloy), and the hardness of metals such as chromium (Cr), of which a thin-film element 1 is formed, are all lower than the hardness of ceramic materials such as alumina-titanium carbide ($Al_2O_3$—TiC). Therefore, when lapping is performed until the base 2 is given the shape of a crown, the thin-film element 1, with a lower hardness, is lapped excessively compared with the base 2.

As described above, in the lapping process, the mounting jig 52, to which slider bars B are mounted, rotates, causing the slider bars B to be lapped in various directions. Therefore, when, in particular, the slider bars B are lapped from the side of their corresponding thin-film elements 1 to the side of their corresponding bases 2, the thin-film elements 1, with a low hardness, formed at an end of their corresponding slide bars B are lapped excessively compared to their corresponding bases 2.

When the thin-film elements 1 are lapped excessively compared to their corresponding bases 2, a stepped portion, or a recess R, of about 15 nm to 20 nm is formed between the thin-film elements 1 and their corresponding bases 2. When recording/reproducing operations of magnetic signals are carried out using a slider S with such a recess R, the distance between the surface of the slider S where the magnetic gap portions of its thin-film element 1 are exposed and the magnetic recording medium becomes large, resulting in spacing loss, so that the efficiency with which recording/reproducing operations of magnetic signals are performed is reduced. During the process in which the recess R is formed, each element layer of the thin-film element 1 is mechanically damaged, thereby deteriorating magnetic characteristics.

As shown in FIG. 12, smears T, produced as a result of lapping when a portion of an element layer exposed at side A of the air bearing surface of a thin-film element 1 flows to the surface of another element layer, may be produced. These smears T tend to be produced particularly if the element layer is formed of a ductile metal. Therefore, they tend to be produced at the lower shield layer 1a1 or the upper shield layer 1a7 (lower core 1b1), formed of Ni—Fe alloy (permalloy), and the electrically conductive layer 1a5, formed of, for example, chromium (Cr), of a slider 1. Since the slider 1 is lapped in various directions as a result of rotating the mounting jig 52, these smears T are produced by radial flow of a portion of an element layer. Since the thin film element 1 is very small, the production of smears T causes each of the element layers to be electrically connected together easily, resulting in a short circuit.

To overcome these problems, it is an object of the present invention to provide a slider producing method which makes it possible to prevent, in a slider lapping process, the formation of a stepped portion between the rails and the thin-film element of a slider, and the occurrence of a short circuit at each of the element layers of the thin-film element.

To this end, according to one aspect of the present invention, there is provided a method of producing a slider comprising the step of lapping a surface of the slider where a magnetic gap portion of a recording/reproducing thin-film element of the slider is exposed, from the side of a base of the slider to the side of the thin-film element, in a substantially fixed direction, in which the slider comprises the recording/reproducing thin-film element and the base at which the thin-film element is formed.

Although not exclusive, in a preferred form of the invention, the slider may be rotationally rocked on a lapping table.

Although not exclusive, in another preferred form of the invention, when the slider is made to rotationally rock on the lapping table, the slider may be made to reciprocate in a direction substantially perpendicular to the lapping direction.

Although not exclusive, in still another preferred form of the invention, when the slider is made to reciprocate in a direction substantially perpendicular to the lapping direction, the surface where the magnetic gap portion of the thin-film element is exposed may be given a crown shape by the lapping operation.

Although not exclusive, in still another preferred form of the invention, when the surface where the magnetic gap portion of the thin-film element is exposed is given a crown shape by the lapping operation, the slider producing method further comprises the step of after the lapping step, polishing the lapped surface by making the lapped surface reciprocate in a direction perpendicular to the direction in which the thin-film elements are placed upon each other.

Although not exclusive, in still another preferred form of the invention, when the slider producing method further comprises the polishing step, the lapped surface may be made to reciprocate not more than three times in the direction perpendicular to the direction in which the thin-film elements are placed upon each other.

According to another aspect of the invention, there is provided a method of producing a slider comprising the steps of: after mounting a slider bar, including a plurality of sliders arranged in a row, onto a mounting jig, each slider including a recording/reproducing thin-film element and a base at which its associated thin-film element is formed, and after the mounting jig is used to bring a surface of the slider bar where a magnetic gap portion of the thin-film elements is exposed into contact with a lapping surface of a lapping table, lapping the slider bar from the side of the bases to the side of the corresponding thin-film elements in a substantially fixed direction, by rotating the lapping table; and dividing the slider bar into the plurality of sliders.

BRIEF DESCRIPTION OF THE DRAWINGS

FIG. 12 is a plan view showing in enlarged form the main portion of the slider illustrated in FIG. 11.

DESCRIPTION OF THE PREFERRED EMBODIMENTS

Figure 1A:
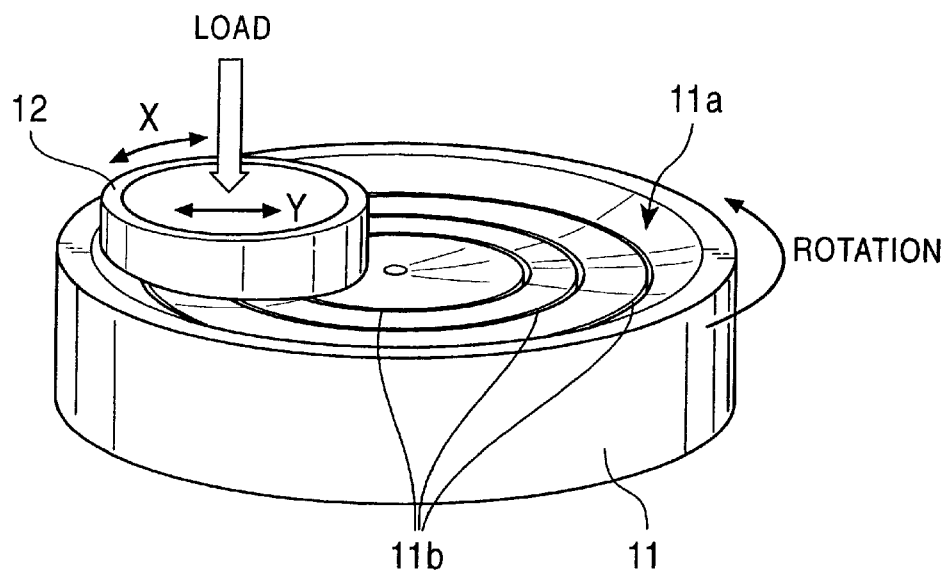
FIGS. 1A and 1B are used to illustrate the lapping process, in an embodiment of the present invention.
Figure 1B:
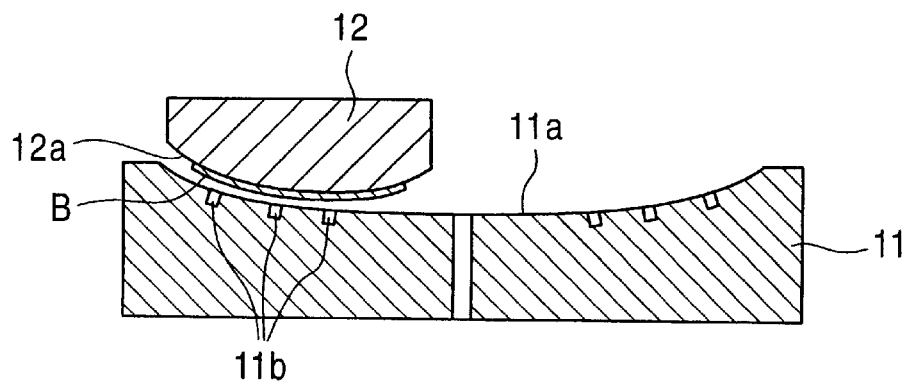
Figure 2:
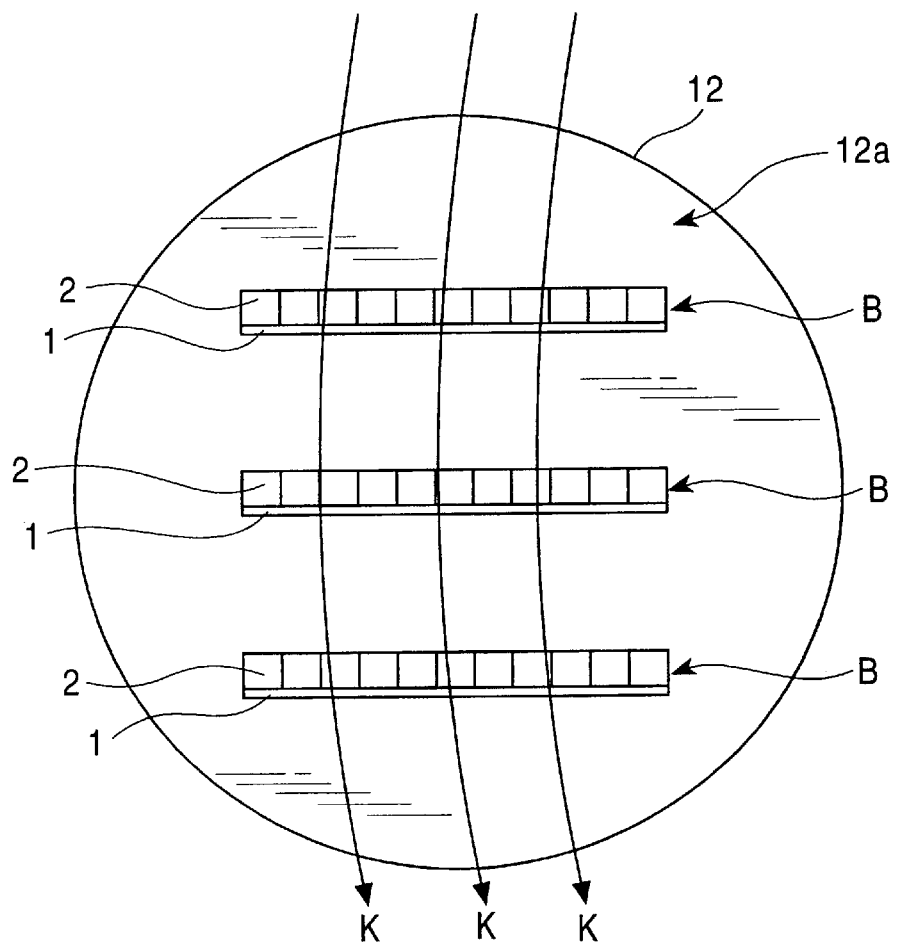
FIG. 2 is a plan view of sliders, in the embodiment of the present invention.
Figure 3:
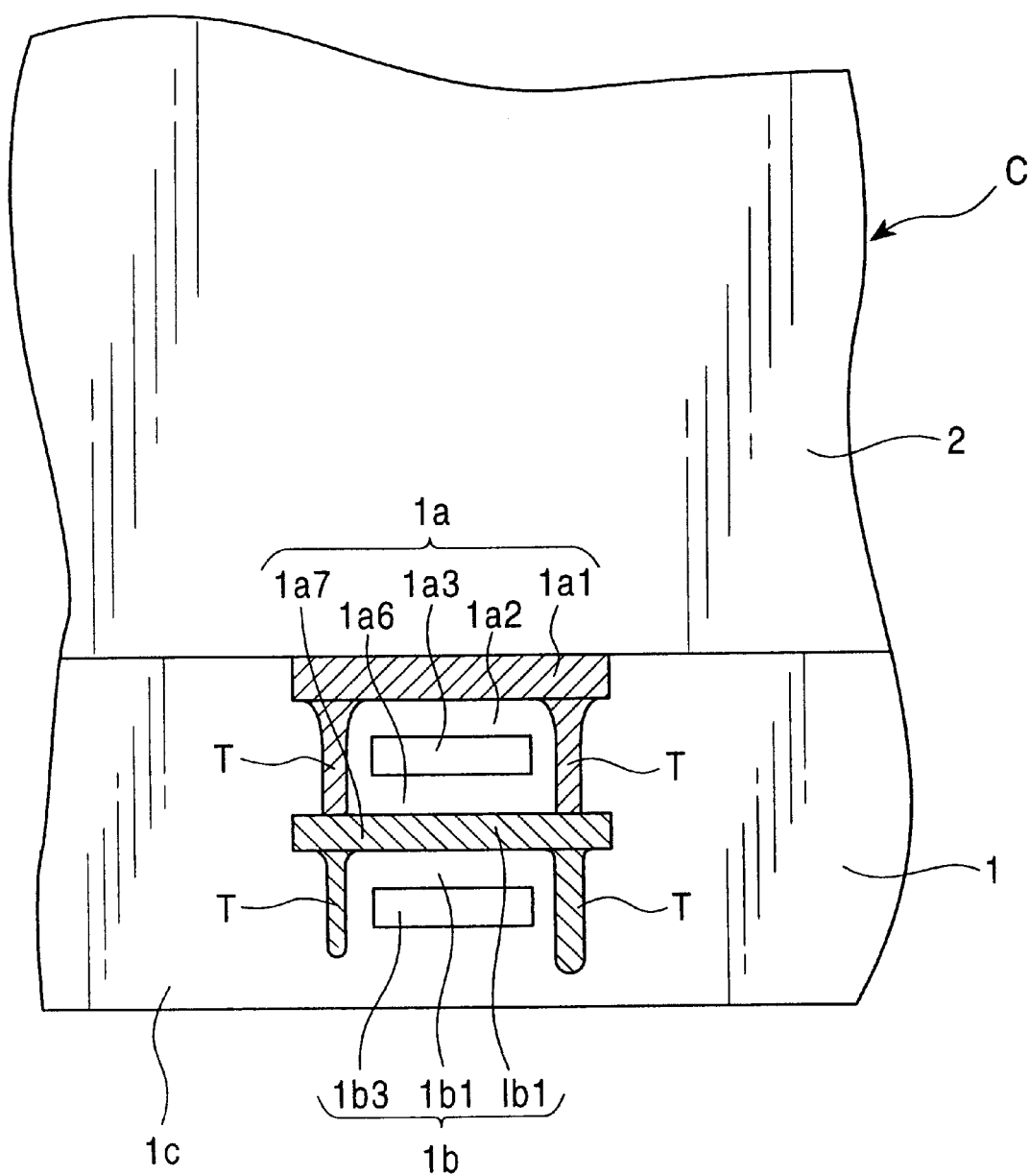
FIG. 3 is an enlarged plan view of the main portion of a slider, in the embodiment of the present invention.
Figure 4:
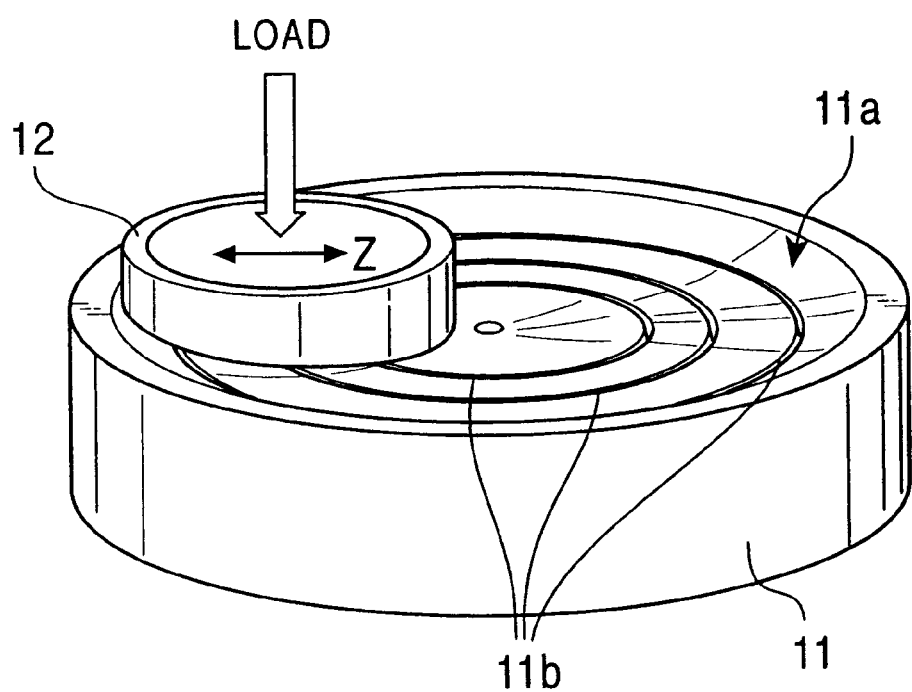
FIG. 4 is used to illustrate the main steps of the lapping process, in the embodiment of the present invention.

A description will now be given below of embodiments of the slider producing method in accordance with the present invention. FIGS. 1A and 1B are used to illustrate the lapping process, in an embodiment of the present invention. FIG. 2 is a plan view of sliders, in the embodiment of the present invention. FIG. 3 is an enlarged plan view of the main portion of a slider, in the embodiment of the present invention. FIG. 4 is used to illustrate the main steps of the lapping process, in the embodiment of the present invention.

Members used in the slider producing method of the present invention corresponding to those used in the conventional slider producing method are given the same reference numerals, and are not described below.

Figure 5:
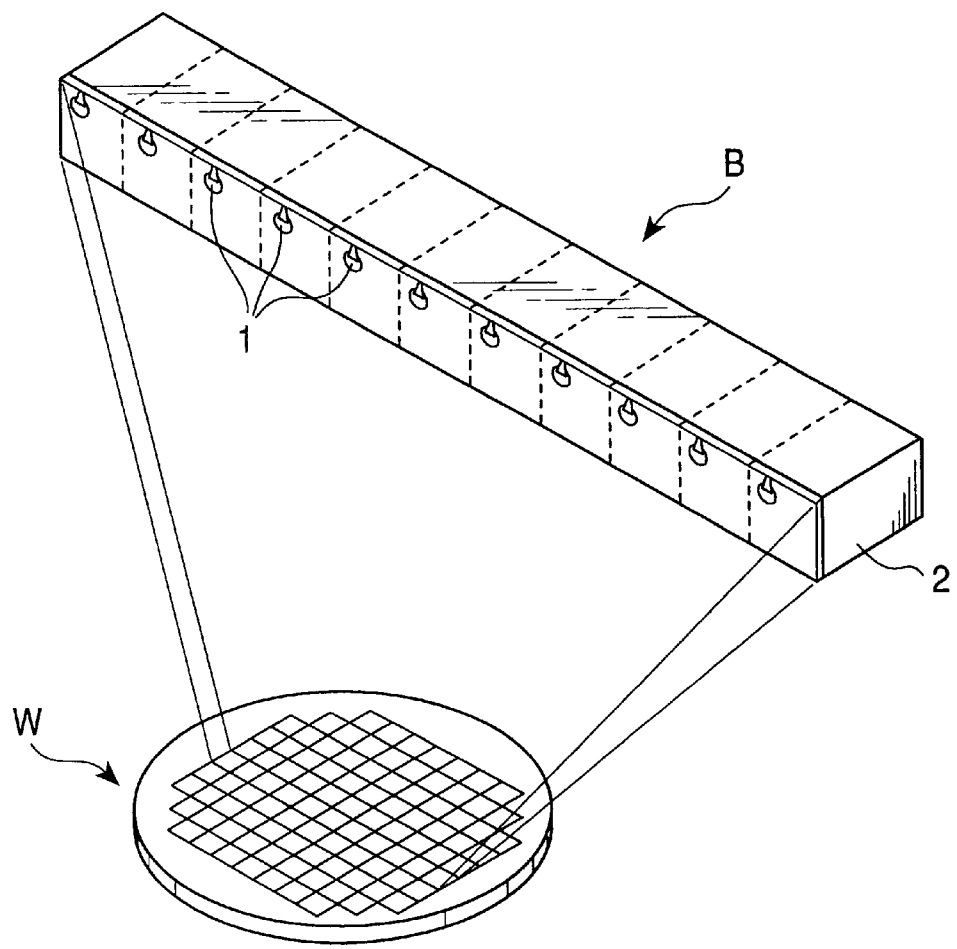
FIG. 5 illustrates a wafer and a slider bar cut out from the wafer, in a conventional slider producing method.
Figure 6:
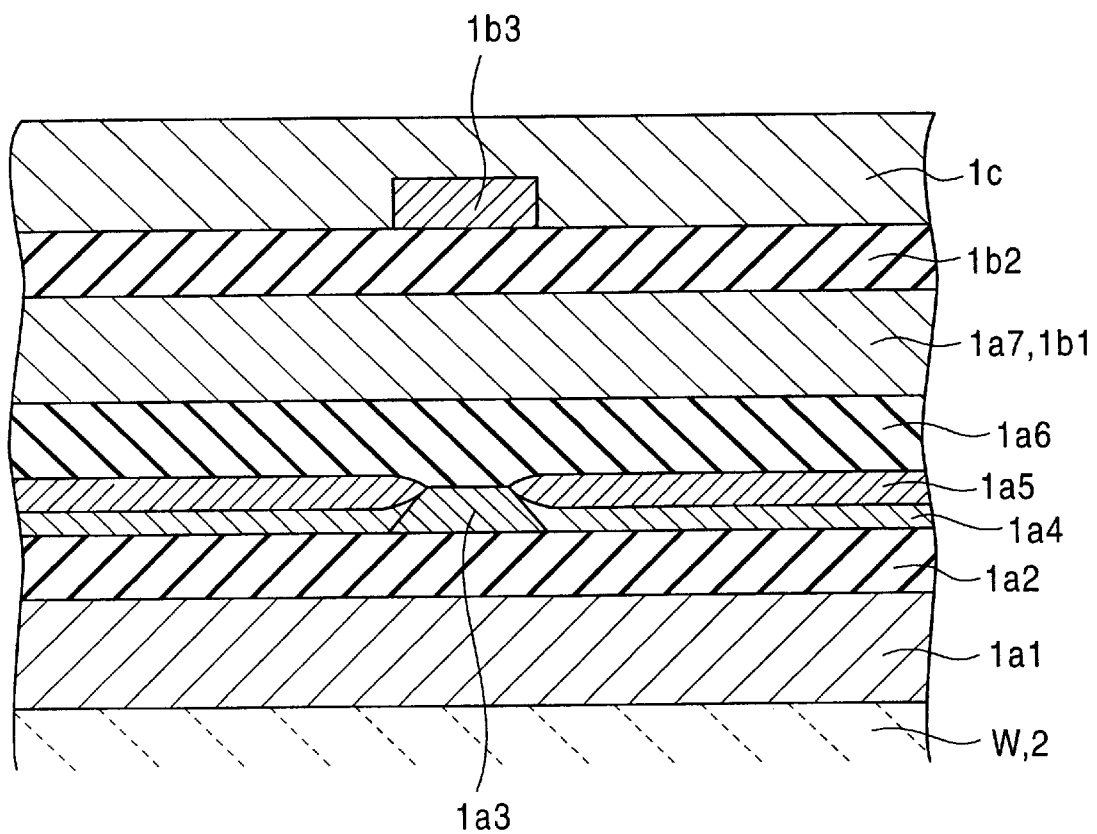
FIG. 6 is a sectional view of the main portion of the wafer illustrated in FIG. 5.
Figure 7:
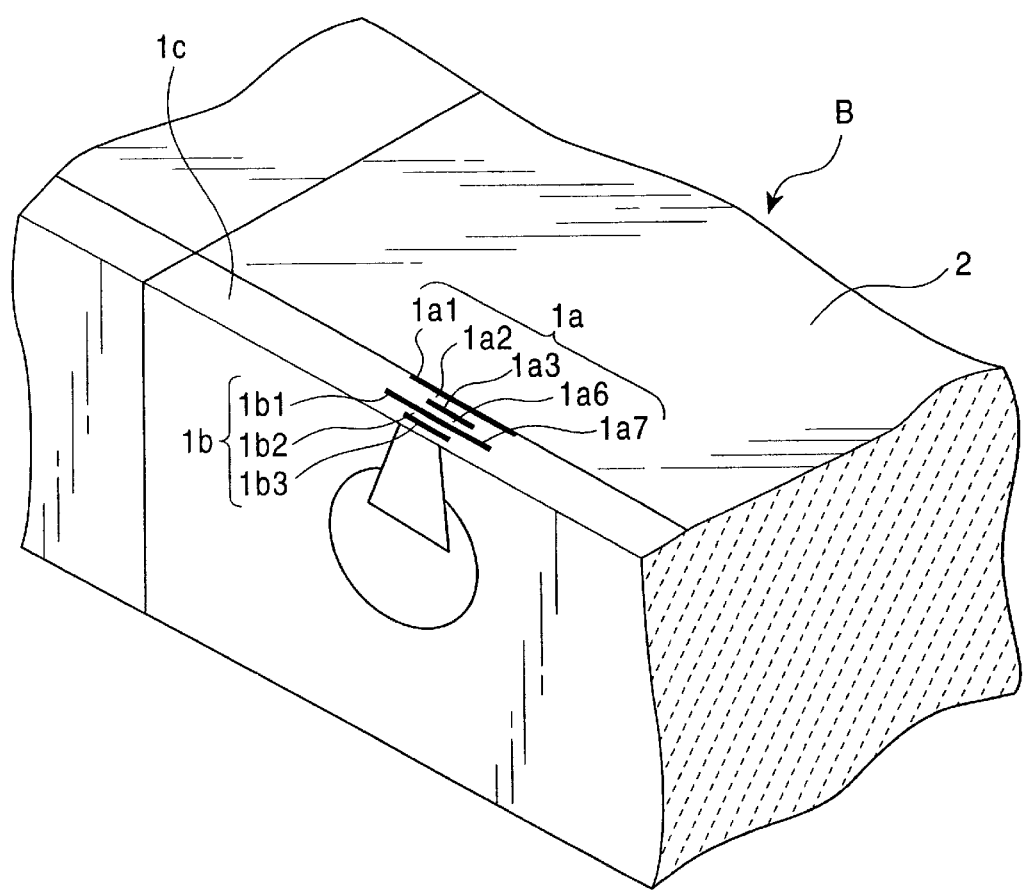
FIG. 7 is a perspective view showing in enlarged form the main portion of the slider bar illustrated in FIG. 5.
Figure 8A:
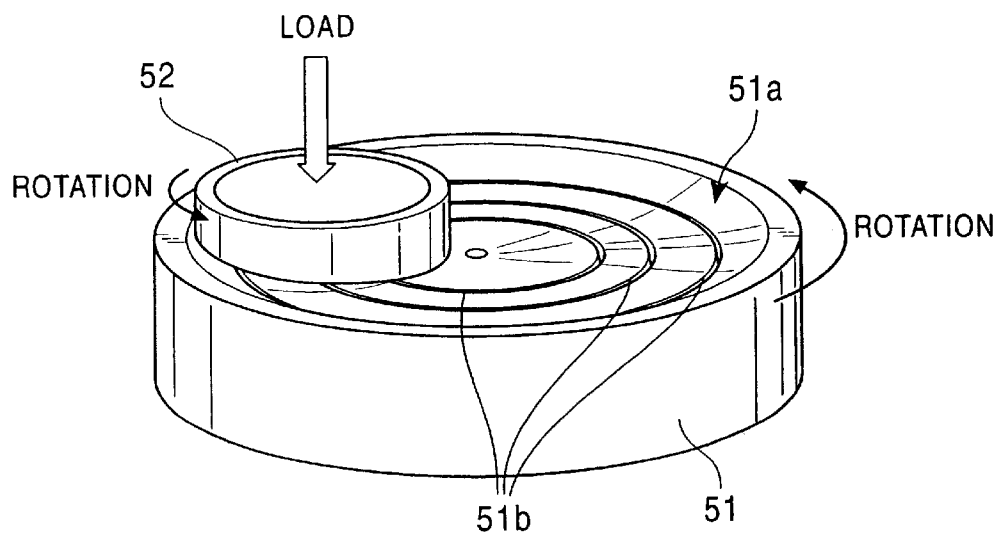
FIGS. 8A and 8B are used to illustrate the lapping process in the conventional slider producing method.
Figure 8B:
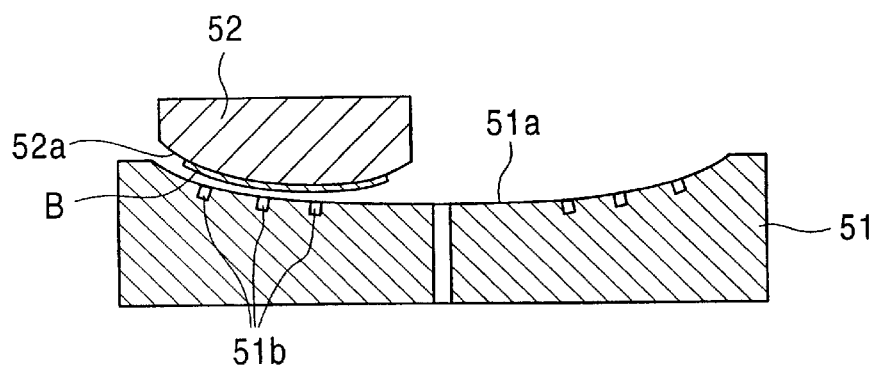
Figure 9:
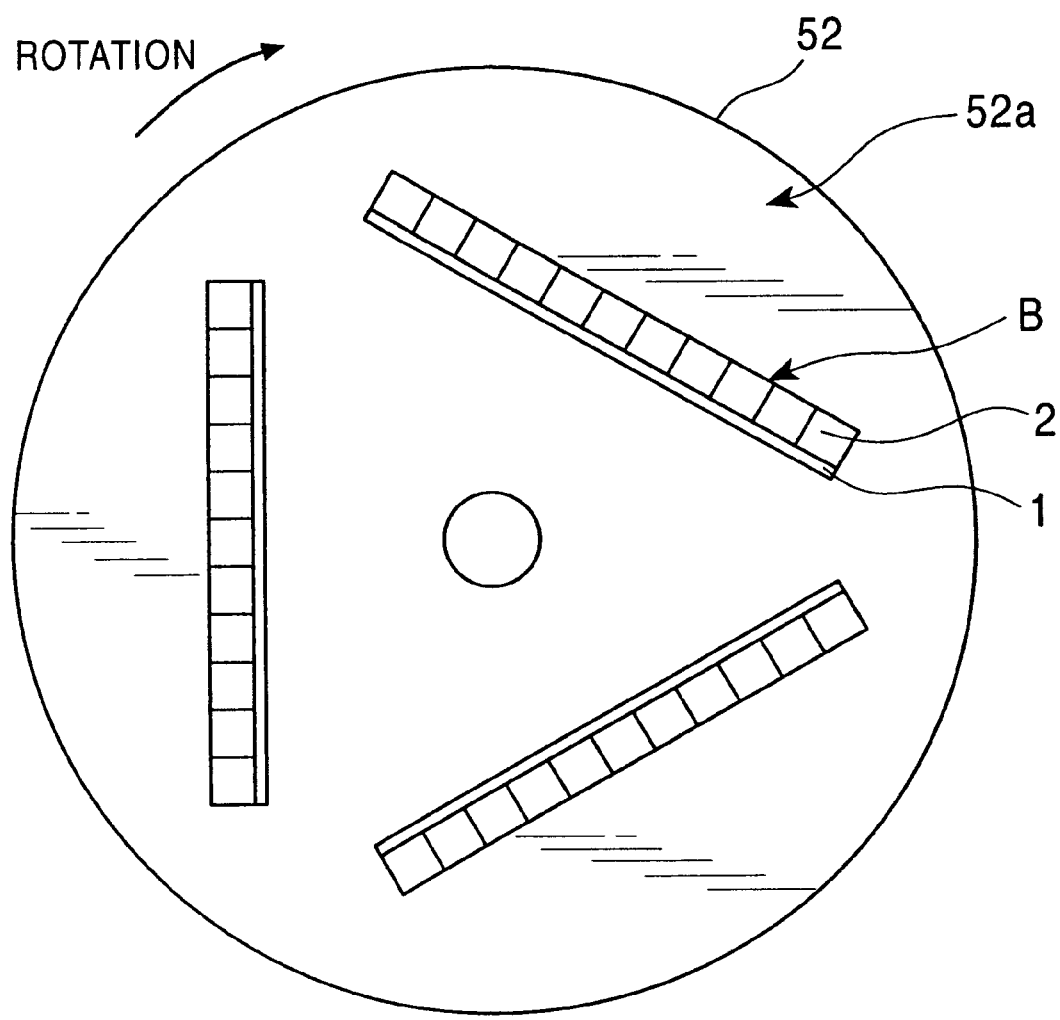
FIG. 9 is used to illustrate the main steps of the lapping process, in the conventional slider producing method.
Figure 10:
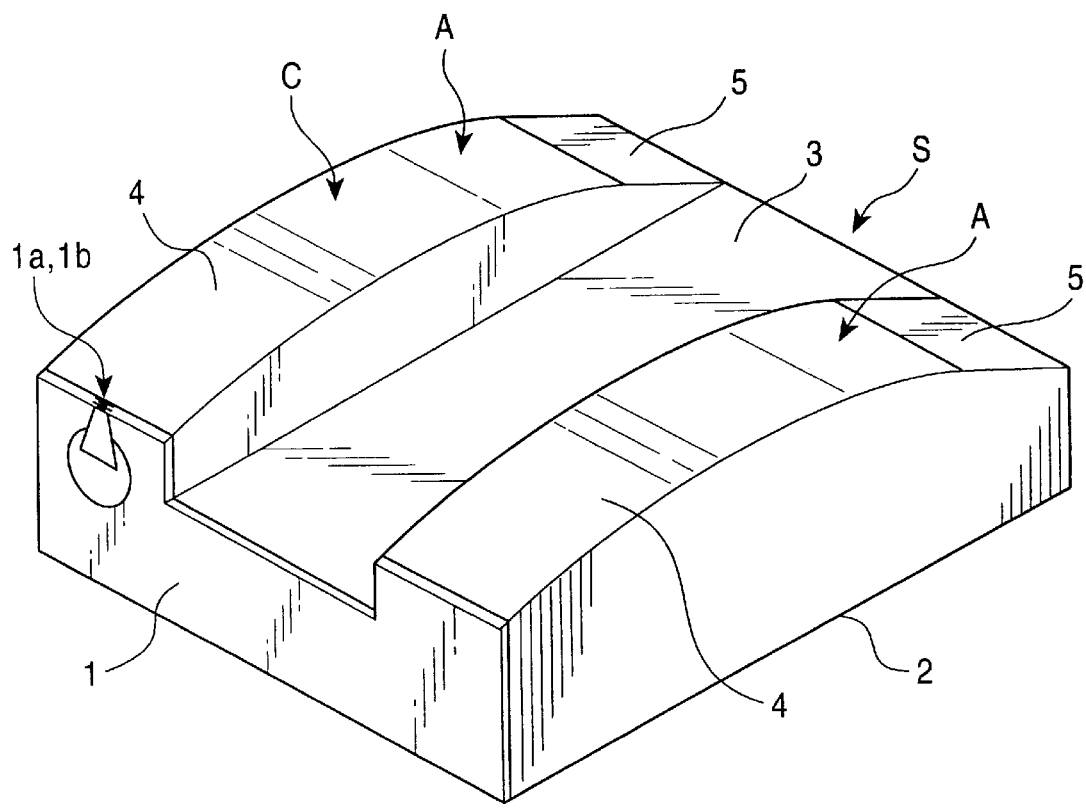
FIG. 10 is a perspective view of a slider, in the conventional slider producing method.
Figure 11:
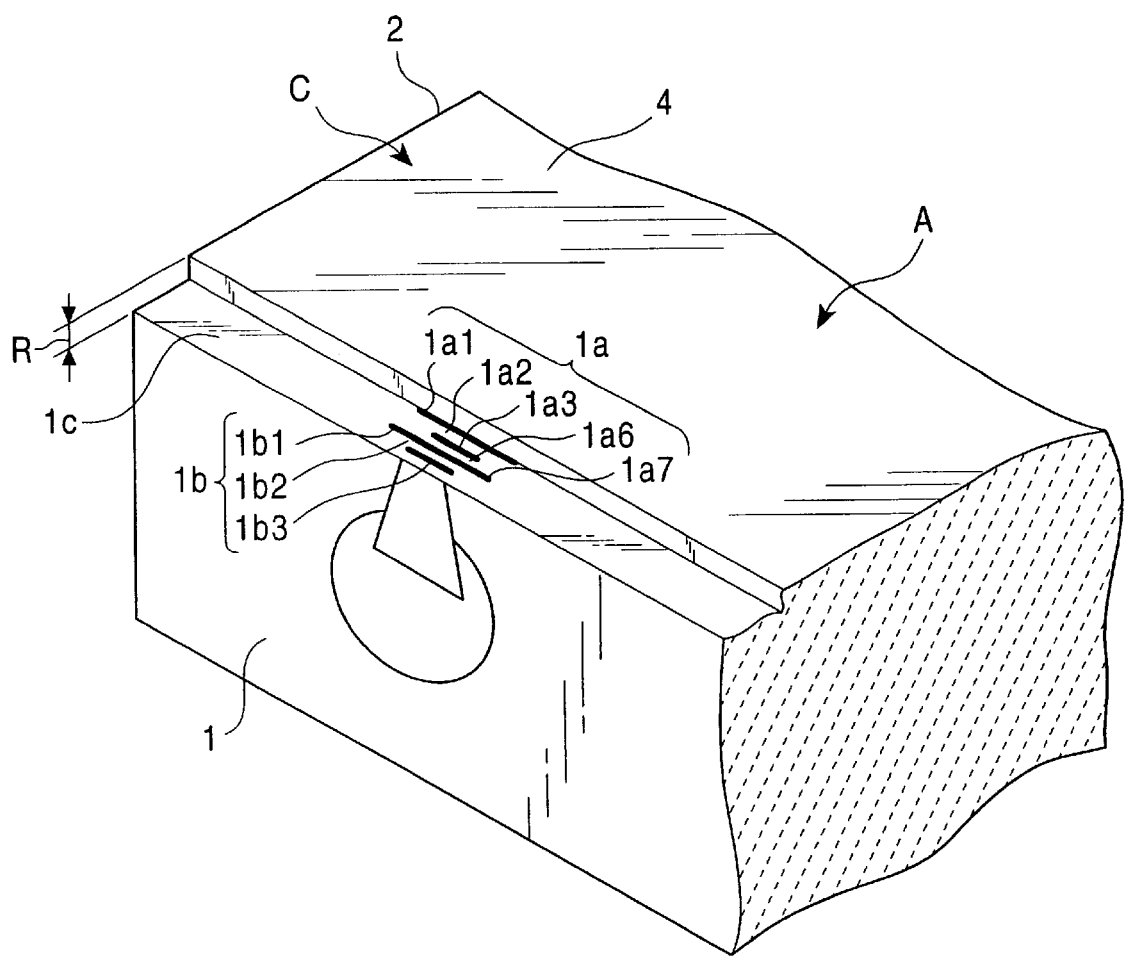
FIG. 11 is a perspective view of a slider which has been lapped using the conventional slider producing method.

As in the conventional slider producing method of FIG. 5, rows of a plurality of recording/reproducing thin-film elements 1 are formed in a pattern on a disk-shaped wafer W formed of, for example, alumina-titanium carbide ($Al_2O_3$—TiC) ceramic. Each thin-film element 1 comprises a reproducing head, for reproducing magnetic signals recorded on a magnetic recording medium, and a recording head, for recording magnetic signals on a magnetic recording medium. Each reproducing head comprises a magnetoresistive (MR) head portion 1a formed by a magnetoresistive effect element portion. Each recording head comprises an inductive head portion 1b formed of a coil and a core, which are formed into a pattern.

With the plurality of thin-film elements arranged in rows, a plurality of rectangular shaped portions are cut out from the wafer W to obtain slider bars B. As in the description of the conventional slider producing method, an end portion (or magnetic gap portion) of the MR head portion 1a and the inductive head portion 1b of each of the aforementioned thin-film elements 1 are exposed at the sectioned surface of the corresponding slider bars B.

With the slider bars B formed, the surface of each slider bar B where the magnetic gap portions of each thin-film element 1 are exposed is lapped. The center portion of each slider bar B is given a crown shape so that its center portion bulges upward, whereby each slider bar B has a spherically curved structure. Each slider bar B is lapped by a lapping machine. As shown in FIG. 1A, a lapping machine comprises a substantially circular cylindrical lapping table formed of tin (Sn), and a mounting jig 12 disposed above the lapping table 11. The lapping table 11 comprises an lapping surface 11a, from which parts of diamond grains embedded therein are exposed, and, as shown in FIG. 1B, a plurality of concentrically formed grooves 11b provided in the lapping surface 11a. The lapping surface 11a is a spherically curved surface and has a circular arc shaped recess. The mounting surface 12a of the mounting jig 12, to which each of the slider bars B is mounted, is a convex-shaped surface formed in correspondence with the spherically curved shape of the lapping surface 11a and so as to oppose the lapping surface 11a.

The plurality of slider bars B are mounted to the convex-shaped mounting surface 12a of the mounting jig 12 with a resilient adhesive material so as to be bent in the longitudinal direction thereof and along the convex-shaped mounting surface 12a. As shown in FIG. 2, the slider bars B are disposed so that their longitudinal directions are parallel, and so that their thin-film elements 1 are placed in rows and face the same side. The surface of each slider bar B where the magnetic gap portions of each thin-film element 1 are exposed is disposed so that it can come into contact with the lapping surface 11a of the lapping table 11. A load is applied to the mounting jig 12 from thereabove, causing each of the slider bars B to be pressed against the lapping surface 11a. As shown in FIG. 1, each of the slider bars B is lapped by rotating the lapping table 11 at a proper speed. With the mounting jig 12, to which the slider bars B are mounted, not rotating, or virtually not in motion, lapping is carried out while a lubricant is supplied to the lapping surface 11a. As shown by arrows K in FIG. 2, each slider bar B is lapped from the side of corresponding bases 2 towards the side of the corresponding thin-film elements 1, towards fixed directions substantially perpendicular to the direction of extension of each of the slider bars B. Excess lubricant or diamond grains, which have come off the lapping surface 11a, fall into the grooves 11b. (This is not illustrated.)

Accordingly, by lapping the slider bars B from the side of their corresponding base portions with high hardness in fixed directions, it is possible to reduce the size of the step, or recess, formed between the bases 2 and the corresponding thin-film elements 1. More specifically, it is possible to reduce the size of the recess to 5 nm or less.

As mentioned above, since the mounting jig 12, to which the slider bars are mounted, is not moving, and the grooves 11b are formed concentrically in the surface of the lapping table 11, the portions of each of the slider bars B disposed above the grooves 11b are not lapped, so that there are protrusions at these portions. Formation of protrusions at the surface of these portions of each of the slider bars B can be prevented by lapping carried out by slightly rocking the mounting jig 12, to which the slider bars B are mounted, in the directions of a double-headed arrow X in FIG. 1.

Formation of protrusions on the surface of each of the slider bars B can be prevented by lapping carried out by making the mounting jig 12, to which the slider bars B are mounted, reciprocate slightly, as indicated by a double-headed arrow Y in FIG. 1, in directions perpendicular to directions in which each of the slider bar B are lapped as a result of rotation of the lapping table 11 (that is in the longitudinal directions of the slider bars B).

It is to be noted that lapping carried out by rocking the mounting jig 12 in the directions of the double-headed arrow X in FIG. 1, and lapping carried out by causing the mounting jig 12 to reciprocate in the directions of the double-headed arrow Y in FIG. 1, can be carried out at the same time. When the above-described operations have been carried out, slider bars B, given a crown shape C so that its center portion bulges slightly upward by lapping, are obtained.

When, as described above, the surface of each slider bar B where the magnetic gap portions of each thin-film element 1 are exposed is lapped, smears T may be produced, so that a portion of an element layer, exposed at side A of an air-bearing surface (ABS) flows to the surface of another element layer of a thin-film element 1, as shown in FIG. 3. These smears T tend to occur particularly if the element layer is formed of a ductile metal. In addition, since the mounting jig 12 is virtually not moving, these smears T are formed as a result of a portion of an element layer flowing in one direction (or in a lapping direction). Further, since the thin-film elements 1 are extremely small, when smears T are produced, each of the element layers are electrically connected together easily, causing a short circuit.

To overcome this problem, when, with reference to FIG. 4, the lapping process is completed, the rotation of the lapping table 11 is stopped in order to carry out a smear T removal step. In the smear T removal step, only the mounting jig 12 (to which the slider bars B are mounted) is made to reciprocate such that the surface of each slider bar B (in contact with the lapping surface 11a of the lapping table 11b which is not moving) where the magnetic gap portion of each thin-film element 1 is exposed reciprocates in a direction perpendicular to the direction in which the element layers are placed upon each other at the surface where the thin-film elements 1 are exposed (that is, in a direction perpendicular to the directions in which each of the slider bars B is lapped by the lapping table 11), whereby the smears T are polished and removed. By making the mounting jig 11 reciprocate by not more than three times, the polishing operation, carried out after the lapping operation by the lapping table 11, allows sufficient removal of the smears T.

As can be understood from the foregoing description, each of the slider bars B (given a crown shape C so that its associated center portion bulges slightly upward by lapping) is formed into a predetermined shape, by, for example, a photolithography process or ion milling, and divided to form a plurality of sliders S.

The present invention is not limited to this embodiment in which lapping is carried out using a lapping table. Although in the embodiment the lapping process is carried out to give a slider air-bearing surface a crown shape, the present invention is not limited in its application thereto. For example, the slider lapping method may be used to prevent the production of recesses or smears when lapping is carried out to perform a smoothing operation to control the depth of the magnetic gap portions of each thin-film element.

According to the present invention, a method of producing a slider comprises the step of lapping a surface of the slider where a magnetic gap portion of a recording/reproducing thin-film element of the slider is exposed, from the side of a base of the slider to the side of the thin-film element, in a substantially fixed direction, in which the slider comprises the recording/reproducing thin-film element and the base at which the thin-film element is formed. By virtue of this method, the base is lapped by the lapping table before the thin-film element with a lower hardness than the base. Therefore, it is possible to prevent the thin-film element from being lapped excessively, thereby preventing the formation of a recess in the ABS surface, preventing spacing loss occurring when a recording medium is subjected to a recording/reproducing operation, and reducing the extent to which each of the element layers of the thin-film element is mechanically damaged.

According to the method of producing a slider, the slider may be rotationally rocked on a lapping table, or may be made to reciprocate in a direction substantially perpendicular to the lapping direction. Therefore, it is possible to prevent protrusions from remaining on the surface of the slider when there are grooves in the lapping table which do not allow lapping of portions of the slider surface disposed in correspondence with the grooves.

According to the method of producing a slider, when the lapping step is performed, the surface where the magnetic gap portion of the thin-film element is exposed may be given a crown shape. Therefore, it is possible to produce a crown-shaped slider in which the size of the recess between the thin-film element and the base is reduced.

According to the method of producing a slider, after the lapping step, the lapped surface may be polished by making the lapped surface reciprocate in a direction perpendicular to the direction in which the thin-film elements are placed upon each other. Therefore, smears, formed by the flowing of a portion of each of the element layers of the thin-film element, can be removed, making it possible to prevent a short circuit from occurring between the element layers.

According to the method of producing a slider, in the polishing step the lapped surface may be made to reciprocate not more than three times in the direction perpendicular to the direction in which the thin-film elements are placed upon each other. Therefore, by making the slider reciprocate a small number of times, smears can be removed.

What is claimed is:

1. A method of producing a slider, comprising the steps of:

mounting a slider bar, including a plurality of sliders arranged in a row, onto a mounting jig, each slider including a recording/reproducing thin-film element and a base at which its associated thin-film element is formed;

using the mounting jig to bring a surface of the slider bar where a magnetic gap portion of the thin-film element of each of the plurality of sliders is exposed into contact with a lapping surface of a lapping table, wherein a plurality of concentric grooves are formed in the lapping surface of the lapping table and the row of sliders is disposed along the lapping table in a direction perpendicular to said concentric grooves;

rotationally lapping the slider bar from a side of the base of each of the plurality of sliders to a side of the corresponding thin-film element of each of the plurality of sliders in a substantially fixed direction by rotating the lapping table, while each of the plurality of sliders is rotationally rocked on the lapping table and each of the plurality of sliders is made to reciprocate in a direction substantially perpendicular to the rotational lapping direction;

polishing the lapped surface after the rotational lapping by making the lapped surface reciprocate in a direction perpendicular to the direction in which the thin-film elements are rotationally lapped; and dividing the slider bar into the plurality of sliders.

2. A method of producing a slider according to claim 1, wherein when the lapping step is performed, the surface where the magnetic gap portion of the thin-film element is exposed is given a crown shape.

3. A method of producing a slider according to claim 1, wherein in the polishing step the lapped surface is made to reciprocate not more than three times in the direction perpendicular to the direction in which the thin-film elements are placed upon each other.

* * * * *